(12) United States Patent
Gold

(10) Patent No.: US 11,534,961 B2
(45) Date of Patent: Dec. 27, 2022

(54) MELT POOL MONITORING SYSTEM AND METHOD FOR DETECTING ERRORS IN A MULTI-LASER ADDITIVE MANUFACTURING PROCESS

(71) Applicant: General Electric Company, Schenectady, NY (US)

(72) Inventor: Scott Alan Gold, Waynesville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 370 days.

(21) Appl. No.: 16/662,662

(22) Filed: Oct. 24, 2019

(65) Prior Publication Data

US 2020/0147867 A1    May 14, 2020

Related U.S. Application Data

(60) Provisional application No. 62/757,855, filed on Nov. 9, 2018.

(51) Int. Cl.
*B29C 67/00* (2017.01)
*B29C 64/153* (2017.01)
(Continued)

(52) U.S. Cl.
CPC .......... *B29C 64/153* (2017.08); *B29C 64/205* (2017.08); *B29C 64/268* (2017.08);
(Continued)

(58) Field of Classification Search
CPC ... B29C 64/153; B29C 64/393; B29C 64/277; B29C 64/268; B29C 64/205;
(Continued)

(56) References Cited

U.S. PATENT DOCUMENTS

| 4,863,538 A | 9/1989 | Deckard |
| 5,304,329 A | 4/1994 | Dickens, Jr. et al. |

(Continued)

FOREIGN PATENT DOCUMENTS

| CN | 1976800 A | 6/2007 |
| CN | 107708971 A | 2/2018 |

(Continued)

OTHER PUBLICATIONS

Extended European Search Report for application EP 19206099.4 dated Dec. 4, 2020 (9 pages).

(Continued)

*Primary Examiner* — Ryan M Ochylski
(74) *Attorney, Agent, or Firm* — Dinsmore & Shohl LLP

(57) ABSTRACT

A system and method of monitoring a powder-bed additive manufacturing process using a plurality of energy sources is provided. A layer of additive powder is deposited on a powder bed and is fused using a first energy source, a second energy source, or any other suitable number of energy sources. The electromagnetic energy emissions at a first melt pool are monitored by a melt pool monitoring system and recorded as raw emission signals. The melt pool monitoring system may also monitor emissions from the powder bed using off-axis sensors or from a second melt pool using on-axis sensors, and these emissions may be used to modify the raw emission signals to generate compensated emission signals. The compensated emission signals are analyzed to identify outlier emissions and an alert may be provided or a process adjustment may be made when outlier emissions exceed a predetermined signal threshold.

20 Claims, 5 Drawing Sheets

(51) Int. Cl.
*B29C 64/393* (2017.01)
*B29C 64/277* (2017.01)
*B29C 64/268* (2017.01)
*B29C 64/205* (2017.01)
*B33Y 10/00* (2015.01)
*B33Y 30/00* (2015.01)
*B33Y 40/00* (2020.01)
*B33Y 50/02* (2015.01)

(52) U.S. Cl.
CPC ......... *B29C 64/277* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ......... B33Y 10/00; B33Y 30/00; B33Y 40/00; B33Y 50/00; B33Y 50/02
See application file for complete search history.

(56) References Cited

U.S. PATENT DOCUMENTS

| | | |
|---|---|---|
| 5,427,733 A | 6/1995 | Benda et al. |
| 5,460,758 A | 10/1995 | Langer et al. |
| 5,609,813 A | 3/1997 | Allison et al. |
| 6,046,426 A | 4/2000 | Jeantette et al. |
| 6,930,278 B1 | 8/2005 | Chung et al. |
| 6,995,334 B1 | 2/2006 | Kovacevic et al. |
| 7,757,632 B2 | 7/2010 | Edwards et al. |
| 8,137,739 B2 | 3/2012 | Philippi et al. |
| 9,662,840 B1 | 5/2017 | Buller et al. |
| 9,925,715 B2 | 3/2018 | Cheverton et al. |
| 9,981,341 B2 | 5/2018 | Mazumder et al. |
| 10,048,661 B2 | 8/2018 | Arthur et al. |
| 2003/0028278 A1 | 2/2003 | Darrah et al. |
| 2004/0191106 A1 | 9/2004 | O'Neill et al. |
| 2004/0200816 A1 | 10/2004 | Chung et al. |
| 2005/0288813 A1 | 12/2005 | Yang et al. |
| 2007/0160820 A1 | 7/2007 | Waters, Jr. |
| 2008/0015814 A1 | 1/2008 | Harvey, Jr. et al. |
| 2009/0206065 A1 | 8/2009 | Kruth et al. |
| 2011/0278277 A1 | 11/2011 | Stork Genannt Wersborg |
| 2012/0237745 A1 | 9/2012 | Dierkes et al. |
| 2013/0300035 A1 | 11/2013 | Snis |
| 2014/0163717 A1 | 6/2014 | Das et al. |
| 2014/0332507 A1 | 11/2014 | Fockele |
| 2014/0358273 A1 | 12/2014 | LaBossiere et al. |
| 2015/0048064 A1 | 2/2015 | Cheverton et al. |
| 2015/0165693 A1 | 6/2015 | Sagoo et al. |
| 2015/0174822 A1 | 6/2015 | Huang et al. |
| 2015/0367447 A1 | 12/2015 | Buller et al. |
| 2016/0184893 A1 | 6/2016 | Dave et al. |
| 2016/0279734 A1 | 9/2016 | Schick et al. |
| 2017/0144223 A1 | 5/2017 | Gold et al. |
| 2017/0203512 A1 | 7/2017 | Gold |
| 2017/0232511 A1 | 8/2017 | Fieldman et al. |
| 2017/0232512 A1 | 8/2017 | Joerger |
| 2017/0232670 A1 | 8/2017 | Joerger et al. |
| 2017/0232671 A1 | 8/2017 | Fieldman |
| 2017/0232672 A1 | 8/2017 | Fieldman et al. |
| 2017/0232682 A1 | 8/2017 | Alcantara Marte et al. |
| 2017/0232683 A1 | 8/2017 | Alcantara Marte et al. |
| 2017/0246682 A1 | 8/2017 | Duerig |
| 2017/0246810 A1 | 8/2017 | Gold |
| 2017/0252805 A1 | 9/2017 | Gillespie et al. |
| 2017/0259504 A1 | 9/2017 | Lin et al. |
| 2017/0266762 A1 | 9/2017 | Dave et al. |
| 2017/0326790 A1 | 11/2017 | Lee et al. |
| 2017/0368640 A1 | 12/2017 | Herzog et al. |
| 2018/0001384 A1 | 1/2018 | Manteiga et al. |
| 2018/0029306 A1 | 2/2018 | Gold et al. |
| 2018/0207750 A1 | 7/2018 | Carter |
| 2018/0250890 A1 | 9/2018 | Claussen et al. |

FOREIGN PATENT DOCUMENTS

| | | |
|---|---|---|
| CN | 107877855 A | 4/2018 |
| CN | 108472870 A | 8/2018 |
| EP | 3369498 A1 | 9/2018 |
| JP | 2008/508129 A | 3/2008 |
| JP | 2012/509189 A | 4/2012 |
| JP | 2015/196164 A | 11/2015 |
| WO | WO2015/040433 A2 | 3/2015 |
| WO | WO2016/015752 A1 | 2/2016 |
| WO | 2016201326 A1 | 12/2016 |
| WO | 2017/085468 A1 | 5/2017 |
| WO | WO2017/158327 A1 | 9/2017 |
| WO | 2017/187147 A1 | 11/2017 |

OTHER PUBLICATIONS

Japanese office action for application 2019-202894 dated Feb. 22, 2021 (6 pages with English Translation).
Chinese office action for application 201911086851.1 dated Jul. 2, 2021 (17 pages with English Translation).
Extended Chinese Search Report and Opinion corresponding to CN Application No. 2017101093524 dated Feb. 27. 2017.
EP Search Report Corresponding to Application No. EP17157450 dated Jul. 6, 2017.
Sood et al., Optimization of Process Parameters in Fused Deposition Modeling Using Weighted Principal Component Analysis, Journal of Advanced Manufacturing Systems, vol. 10, Issue 2, Dec. 11, 2011, pp. 241-259.
Vlasea et al., Development of powder bed fusion additive manufacturing test bed for enhanced real time process control, Solid Freeform Fabrication Symposium, National Institute of Standards and Technology, 2015, pp. 527-539.
European office action for application 19206099.4 dated Oct. 27, 2021 (6 pages).

MELT POOL MONITORING SYSTEM AND METHOD FOR DETECTING ERRORS IN A MULTI-LASER ADDITIVE MANUFACTURING PROCESS

PRIORITY INFORMATION

The present applicant claims priority to U.S. Provisional Patent Application Ser. No. 62/757,855 titled "Melt Pool Monitoring System and Method for Detecting Errors in a Multi-Laser Additive Manufacturing Process" filed on Nov. 9, 2018, the disclosure of which is incorporated by reference herein.

FIELD

The present disclosure generally relates to additive manufacturing machines, or more particularly, to error detection systems additive manufacturing machines using multiple energy sources.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and/or ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass, and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress relief process. Additionally, thermal, mechanical, and chemical post processing procedures can be used to finish the part.

In order to monitor the additive manufacturing process, certain conventional additive manufacturing machines include melt pool monitoring systems. These monitoring systems typically include one or more cameras or light sensors for detecting light that is radiated or otherwise emitted from the melt pool generated by the energy beam. The camera or sensor values can be used to evaluate the quality of the build as it proceeds or after completion of the build process. The quality evaluation may be used to adjust the build process, stop the build process, troubleshoot build process anomalies, issue a warning to the machine operator, and/or identify suspect or poor quality parts resulting from the build.

However, conventional melt pool monitoring systems are configured for monitoring the operation of a single energy source or melt pool. Notably, additive manufacturing machines may include multiple energy sources for creating multiple melt pools, e.g., to decrease print times. Interactions between multiple melt pools and their corresponding electromagnetic emissions, sintering byproducts, and heat generation may affect the sensor readings associated with a particular melt pool. Conventional monitoring systems fail to compensate for variation in measured signals based on these interactions. In addition, most melt pool monitoring systems perform data analysis after a build is completed or are otherwise complex and delayed in identifying process issues. Moreover, such melt pool monitoring systems are frequently not effective at identifying process faults that result in quality issues in finished parts, scrapped parts, increased material costs, and excessive machine downtime.

Accordingly, an additive manufacturing machine with improved error detection systems would be useful. More particularly, a system and method for utilizing a melt pool monitoring system to monitor multiple melt pools and compensate for melt pool interactions for quickly and accurately detecting process issues during operation of an additive manufacturing machine would be particularly beneficial.

BRIEF DESCRIPTION

Aspects and advantages will be set forth in part in the following description, or may be obvious from the description, or may be learned through practice of the invention.

According to one embodiment of the present subject matter, a method of monitoring a powder-bed additive manufacturing process utilizing a plurality of energy sources is provided. The method includes depositing a layer of additive material on a powder bed of an additive manufacturing machine, selectively directing energy from a first energy source onto a first focal point on the layer of additive material, simultaneously selectively directing energy from a second energy source onto a second focal point on the layer of additive material, and measuring raw emission signals from the powder bed at the first focal point using a melt pool monitoring system. The method further includes modifying the raw emission signals based at least in part on interactions between the raw emission signals and the operation of the second energy source to obtain a compensated emission signal, identifying outlier emissions from the compensated emission signal where the compensated emission signal exceeds a predetermined signal threshold, and generating an alert in response to identifying outlier emissions.

According to another exemplary embodiment, an additive manufacturing machine is provided including a powder depositing system for depositing a layer of additive material onto a powder bed of the additive manufacturing machine, a first energy source for selectively directing a first energy beam onto a first focal point on the layer of additive material, and a second energy source for simultaneously selectively directing a second energy beam onto a second focal point on the layer of additive material. A melt pool monitoring system measures electromagnetic energy emitted from the powder bed and a controller is operably coupled to the melt pool monitoring system, the controller being configured for measuring first emission signals emitted from a first melt pool formed at the first focal point by the first energy beam, measuring second emission signals emitted from a second melt pool formed at the second focal point by the second energy beam, and modifying the first emission signals based at least in part on the second emission signals to obtain a compensated emission signal. The controller is further configured for identifying outlier emissions where the compensated emission signal exceeds a predetermined signal threshold and generating an alert in response to identifying outlier emissions.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
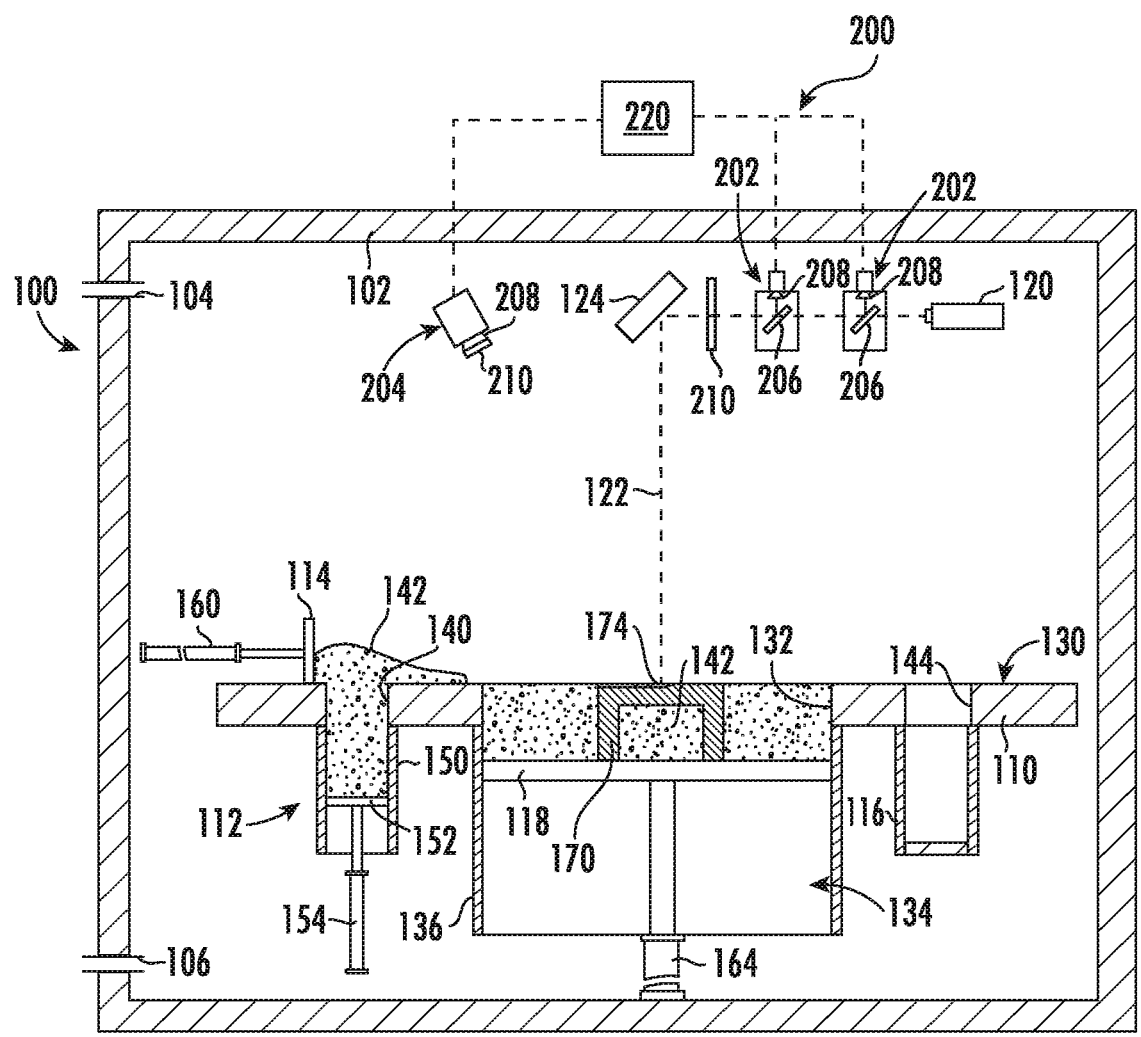
FIG. 1 shows a schematic view of an additive manufacturing machine according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, as used herein, terms of approximation, such as "approximately," "substantially," or "about," refer to being within a ten percent margin of error.

The present subject matter is generally directed to a method for real time monitoring of a powder-bed additive manufacturing processes, e.g., such as a DMLM process, particularly when multiple energy sources are used. In this regard, during the printing of each layer of a part, a system controller may operate a melt pool monitoring system and implement a control algorithm to monitor melt pool characteristics, such as emission intensity, melt pool dimensions, spectral signature, etc.

The data stream recorded by the melt pool monitoring system may be analyzed and compensation may be implemented to account for interactions between the various energy sources, the purge gasflow, and other print process interactions. In general, a system controller may monitor the print process, including melt pool data, for each printed layer. The analysis may include scanning the melt pool data, generating a compensated emission signal, and identifying extreme outliers within the compensated emission signals. If extreme outliers are identified, the controller may flag the layer for further analysis, stop the print process, make an adjustment to the print process, notify an operator, or make any other operating adjustment.

Thus, the system and methods described herein may be used to detect print errors or process faults and notify the operator accordingly. Alternatively, the additive manufacturing machine may be configured for making operating adjustments to correct or rectify such errors or printing issues. In this manner, process interruptions which may otherwise lead to scrapped parts, wasted material, lost time, and other unnecessary costs and delays may be avoided. Moreover, these issues may be detected in real time and addressed immediately, saving time and money as well as effectively increasing capacity. In addition, the present methods can be executed by a dedicated or system controller, may reduce computational requirements, may require minimal computer memory and processor resources, etc.

Referring to FIG. 1, a laser powder bed fusion system, such as a DMLS or DMLM system 100 will be described according to an exemplary embodiment. As illustrated, system 100 includes a fixed enclosure 102 which provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply 112, a scraper or recoater mechanism 114, an overflow container or reservoir 116, and a build platform 118 positioned within enclosure 102. In addition, one or more energy sources 120 generate energy beams 122 and an associated beam steering apparatus 124 directs those respective energy beams 122 to facilitate the AM process. Specifically, FIG. 1 illustrates a single energy source 120 to generally describe the AM system and print process. However, it should be appreciated that according to alternative embodiments, AM system 100 may use any suitable number, type, or configuration of energy sources 120 (such as illustrated for example in FIG. 3). Each of these system components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. In addition, build surface 130 defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

Energy sources 120 may include any known devices operable to generate one or more beams of suitable power and other operating characteristics to sinter, melt, or otherwise fuse the powder during the build process. For example, each energy source 120 may be a laser or any other suitable irradiation emission directing device or irradiation device. In addition, each energy source may include any suitable number, type, or configuration of filters, beam-directing apparatus, focusing elements, etc. Other directed-energy sources such as electron beam guns are suitable alternatives to a laser.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. It should be appreciated that other types of energy sources 120 may be used which may use and alternative beam steering apparatus 124. For example, if the energy source 120 is an electronic control unit for directing an electron beam, beam steering apparatus 124 may be, e.g. a deflecting coil.

Prior to an additive manufacturing process, recoater actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts 170 being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 1). Subsequently, recoater mechanism 114 may be moved back to a starting position.

Figure 2:
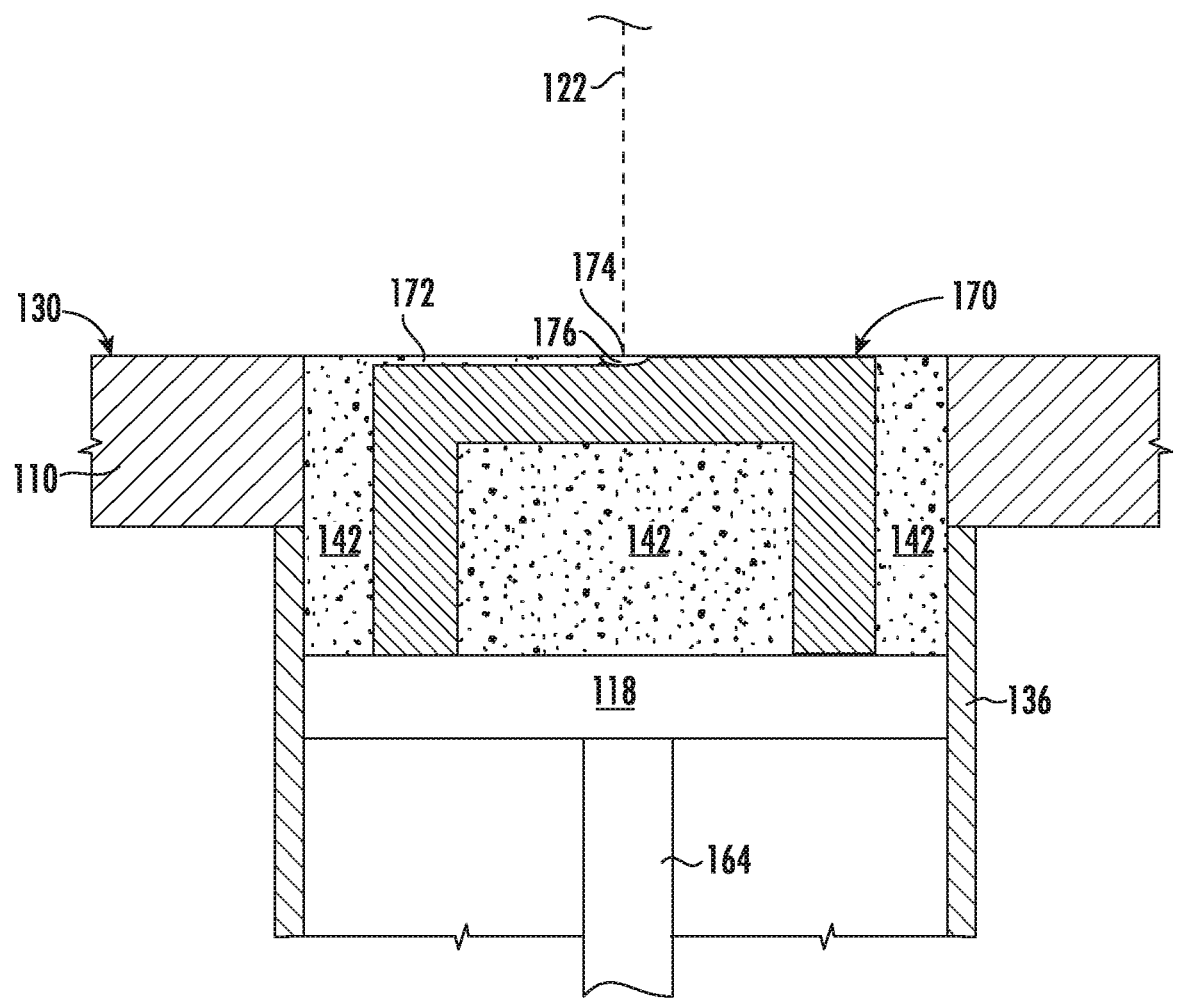
FIG. 2 shows a close-up schematic view of a build platform of the exemplary additive manufacturing machine of FIG. 1 according to an exemplary embodiment of the present subject matter.

Therefore, as explained herein and illustrated in FIG. 1, recoater mechanism 114, recoater actuator 160, supply platform 152, and supply actuator 154 may generally operate to successively deposit layers of additive powder 142 or other additive material to facilitate the print process. As such, these components may collectively be referred to herein as powder depositing apparatus, system, or assembly. The leveled additive powder 142 may be referred to as a "build layer" 172 (see FIG. 2) and the exposed upper surface thereof may be referred to as build surface 130. When build platform 118 is lowered into build chamber 134 during a build process, build chamber 134 and build platform 118 collectively surround and support a mass of additive powder 142 along with any components 170 being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component 170 being built. More specifically, energy beam 122 is emitted from energy source 120 and beam steering apparatus 124 is used to steer a focal point 174 of energy beam 122 over the exposed powder surface in an appropriate pattern. A small portion of exposed layer of the additive powder 142 surrounding focal point 174, referred to herein as a "weld pool," "melt pool," or "heat effected zone" 176 (best seen in FIG. 2) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits energy beam 122 and beam steering apparatus 124 is used to steer the focal point 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component 170 is complete.

As explained briefly above, as energy source 120 and beam steering apparatus 124 direct energy beam 122, e.g., a laser beam or electron beam, onto the powder bed or build surface 130, the additive powders 142 are heated and begin to melt into melt pool 176 where they may fused to form the final component 170. Notably, the heated material emits electromagnetic energy in the form of visible and invisible light. A portion of the directed energy beam is reflected back into the galvanometer scanner or beam steering apparatus 124 and a portion is generally scattered in all other directions within enclosure 102. Generally speaking, monitoring the emitted and/or reflected electromagnetic energy may be used to improve process monitoring and control. An exemplary system for monitoring the additive manufacturing process, e.g., using a melt pool monitoring system 200 to detect process faults or build errors are described below according to exemplary embodiments.

Referring still to FIG. 1, a melt pool monitoring system 200 which may be used with system 100 for monitoring melt pool 176 and the manufacturing process in general will be described according to an exemplary embodiment of the present subject matter. Melt pool monitoring system 200 includes one or more electromagnetic energy sensors, e.g., such as light sensors, for measuring the amount of visible or invisible electromagnetic energy emitted from or reflected by melt pool 176. In this regard, "electromagnetic energy," "emissions," or the like may be used herein to refer to one or more of light or emission intensity, photodiode voltage response, pyrometer voltages or current response, light emission geometric dimensions, spectral response, area or wavelength of emissions, sensor noise response, or any other suitable measurable quantity or quality of electromagnetic energy.

According to the illustrated embodiment shown in FIG. 1, melt pool monitoring system 200 includes two on-axis light sensors 202 and one fixed, off-axis light sensor 204. Each of these sensors 202, 204 will be described below according to an exemplary embodiment. However, it should be appreciated that melt pool monitoring system 200 may include any other suitable type, number, and configuration of sensors for detecting electromagnetic energy and other properties of melt pool 176 or the process in general. For example, for the embodiment illustrated in FIG. 3 and described below, melt pool monitoring system 200 may have a similar number and type of light sensors for monitoring a melt pool generated by a second energy source 120.

As used herein, "beamline" or "on-axis" melt-pool sensors 202 refer to sensors which generally are positioned along or optically coupled with the path of energy beam 122. These sensors may monitor emitted and/or reflected light returning along the beam path. Specifically, as energy beam 122 forms melt pool 176, a portion of the emitted and reflected electromagnetic energy from melt pool 176 returns to energy source 120 along the same path. An on-axis sensor 202 may include a beam splitter 206 positioned along the beamline which may include a coating for redirecting a portion of the electromagnetic energy toward a beamline sensing element 208. In this regard, for example, sensing element 208 may be a photodiode, a pyrometer, an optical camera, an infrared (IR) camera, a photomultiplier tube, or a spectrometer or other spectral sensor configured for measuring electromagnetic energy in any frequency spectrum(s), such as infrared (IR), ultraviolet (UV), visible light, etc. On-axis sensor 202 can measure any suitable parameter of the filtered, reflected beam, such as intensity, frequency, wavelength, etc.

In addition, as used herein, "fixed" or "off-axis" melt-pool sensors 204 refer to sensors which generally have a fixed position relative to melt pool 176 and are used to measure electromagnetic energy generated by energy beam 122 and melt pool 176 within a specified field of view. In addition, fixed melt pool sensors 204 may include any suitable device, such as, e.g., a photodiode or infrared (IR) camera. Off-axis melt pool sensors 204 may operate in a manner similar to on-axis melt pool sensors 202, but are not located on the beamline and include a sensing element 208 that is generally configured for monitoring scattered electromagnetic energy from the melt pool 176.

According to exemplary embodiments of the present subject matter, melt pool monitoring system 200 may further include one or more filters 210 for filtering electromagnetic energy before it reaches sensing elements 208 of respective sensors 202, 204. For example, filter 210 may remove the wavelength of energy beam 122, such that sensors 202, 204 monitor only reflected electromagnetic energy. Alternatively, filters 210 may be configured for removing other unwanted wavelengths for improved monitoring of melt pool 176 or the process in general.

Melt pool monitoring system 200 further includes a controller 220 which is operably coupled with on-axis light sensor 202 and/or off-axis light sensor 204 for receiving signals corresponding to the detected electromagnetic energy. Controller 220 may be a dedicated controller for melt pool monitoring system 200 or may be system controller for operating AM system 100. Controller 220 may include one or more memory devices and one or more microprocessors, such as general or special purpose microprocessors operable to execute programming instructions or micro-control code associated with an additive manufacturing process or process monitoring. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 220 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 3:
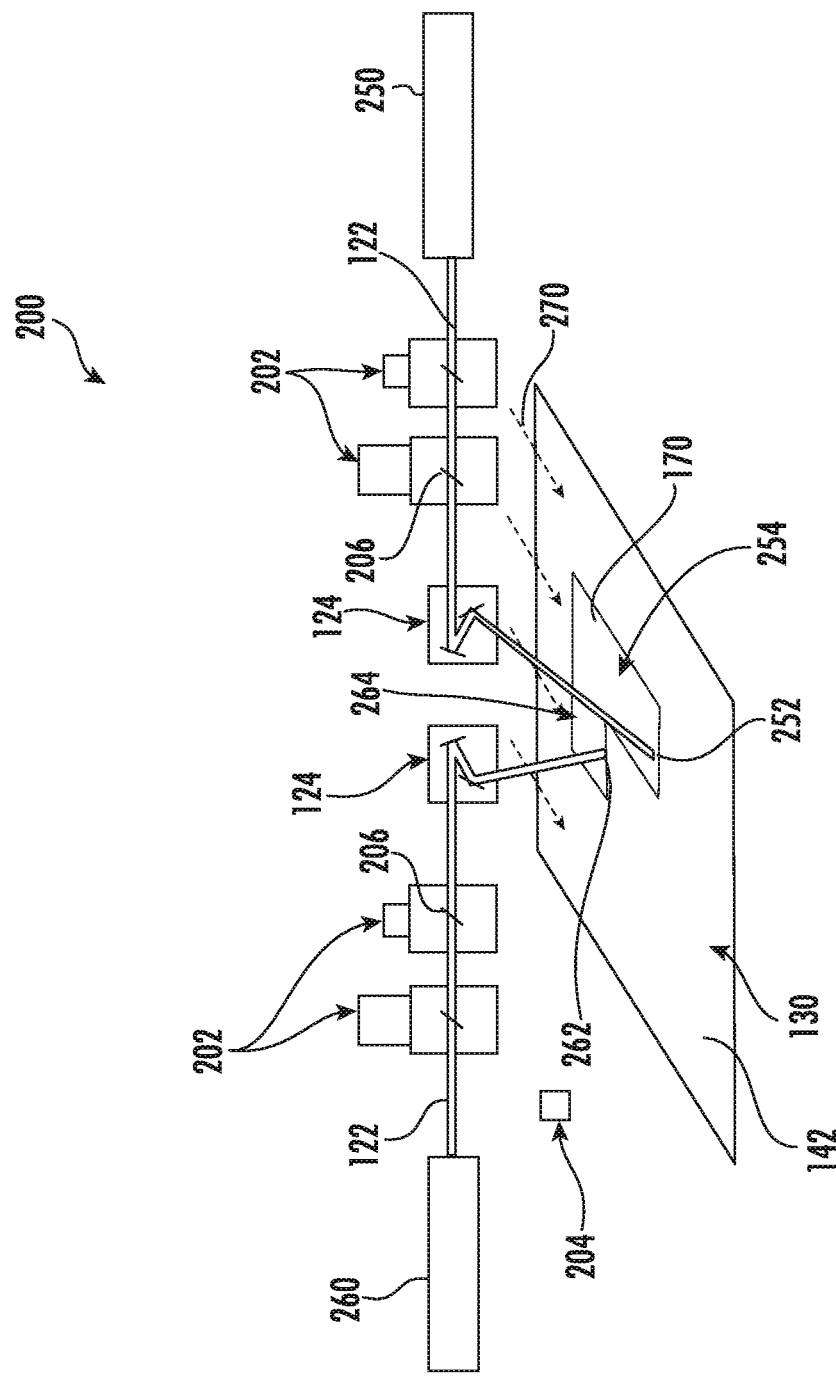
FIG. 3 shows a schematic view of an additive manufacturing machine using a plurality energy sources according to an exemplary embodiment of the present subject matter.
Figure 5:
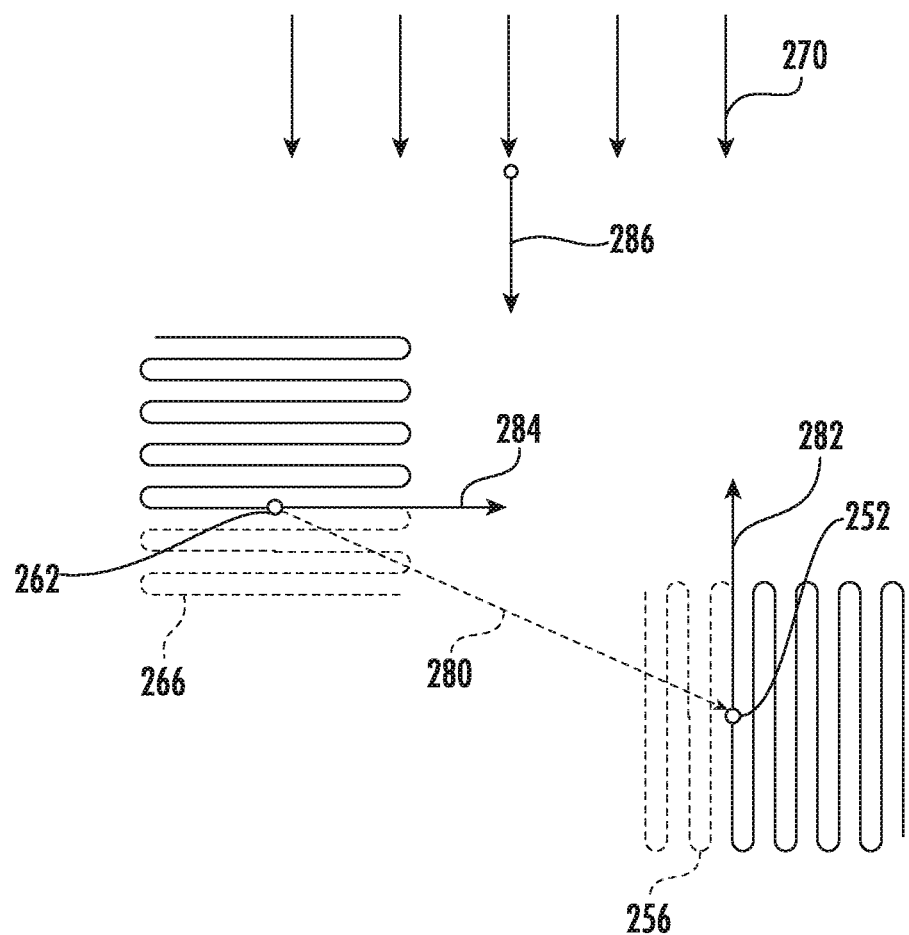
FIG. 5 provides a schematic view of commanded tool paths of a first energy source and a second energy source, projected trajectories of those energy sources, and a purge gasflow according to an exemplary embodiment of the present subject matter.

Referring now briefly to FIG. 3, an alternative embodiment of AM system 100 is illustrated which includes multiple energy sources 120 which are configured for simultaneously printing each layer of component 170. Specifically, as illustrated, AM system 100 includes a first energy source 250 which generates a first melt pool 252 to form a first region 254 of component 170 within build layer 172. Specifically, first energy source 250 may follow a first commanded tool path 256 (e.g., as identified in dotted lines in FIG. 5, with solid lines showing printed regions).

In addition, AM system 100 includes a second energy source 260 which generates a second melt pool 262 to form a second region 264 of component 170 within build layer 172. Specifically, second energy source 260 may follow a second commanded tool path 266 (e.g., as identified in dotted lines in FIG. 5, with solid lines showing printed regions). Notably, each of first energy source 250 and second energy source 260 may be the same as or similar to energy sources 120 as described above. In addition, melt pool monitoring system 200 may include one or more on-axis light sensors 202 and/or off-axis light sensors 204 for monitoring electromagnetic emissions from first melt pool 252 and second melt pool 262. Thus, the same or similar reference numerals may be used to refer to the same or similar items in FIGS. 1 through 3.

As shown in FIG. 3, first energy source 250 and second energy source 260 may operate in close proximity to each other such that electromagnetic emissions emitted from first melt pool 252 may interact with electromagnetic emissions emitted from second melt pool 262, and vice versa. In addition, AM system 100 may further include a purge gas flow system (not shown) which is generally configured for urging a flow of purge gas 270 across build layer 172 during the printing process. In this regard, when the additive powder is melted or sintered, a plume of gases, dust, particulates, or other byproducts may be generated. Notably, it is desirable to remove or evacuate these byproducts from the melting or sintering area for improved printing. The purge gas flow system may be a gas flow system for urging the flow of purge gas 270 above and parallel to the powder bed to remove such byproducts.

It should be appreciated that AM system 100 and melt pool monitoring system 200 are illustrated and described herein only for explaining aspects of the present subject matter. However, the scope of the present subject matter is not limited to such exemplary embodiments, but is instead contemplated as including embodiments including variations and modifications. For example, melt pool monitoring system 200 may include different configurations and sensor types, AM system 100 may include alternative or additional features, and other variations may be applied according to alternative embodiments. In addition, other suitable forms and/or types of powder supply 112 may be used, such as a powder container that moves along build surface 130 while depositing additive powder at a predetermined flow rate. Furthermore, any suitable configuration of beam steering apparatus 124 may be used, e.g., based on the type of energy beam 122 generated. Other configurations are possible and within the scope of the present subject matter.

Now that the construction and configuration of AM system 100 and melt pool monitoring system 200 have been described according to exemplary embodiments of the present subject matter, an exemplary method 300 for monitoring an additive manufacturing process will be described according to an exemplary embodiment of the present subject matter. Method 300 can be used to monitor the operation of AM system 100 using melt pool monitoring system 200, or may be used to monitor any other suitable additive manufacturing machine using any other suitable sensor systems. In this regard, for example, controller 220 may be configured for implementing some or all steps of method 300. Further, it should be appreciated that the exemplary method 300 is discussed herein only to describe exemplary aspects of the present subject matter, and is not intended to be limiting.

Figure 4:
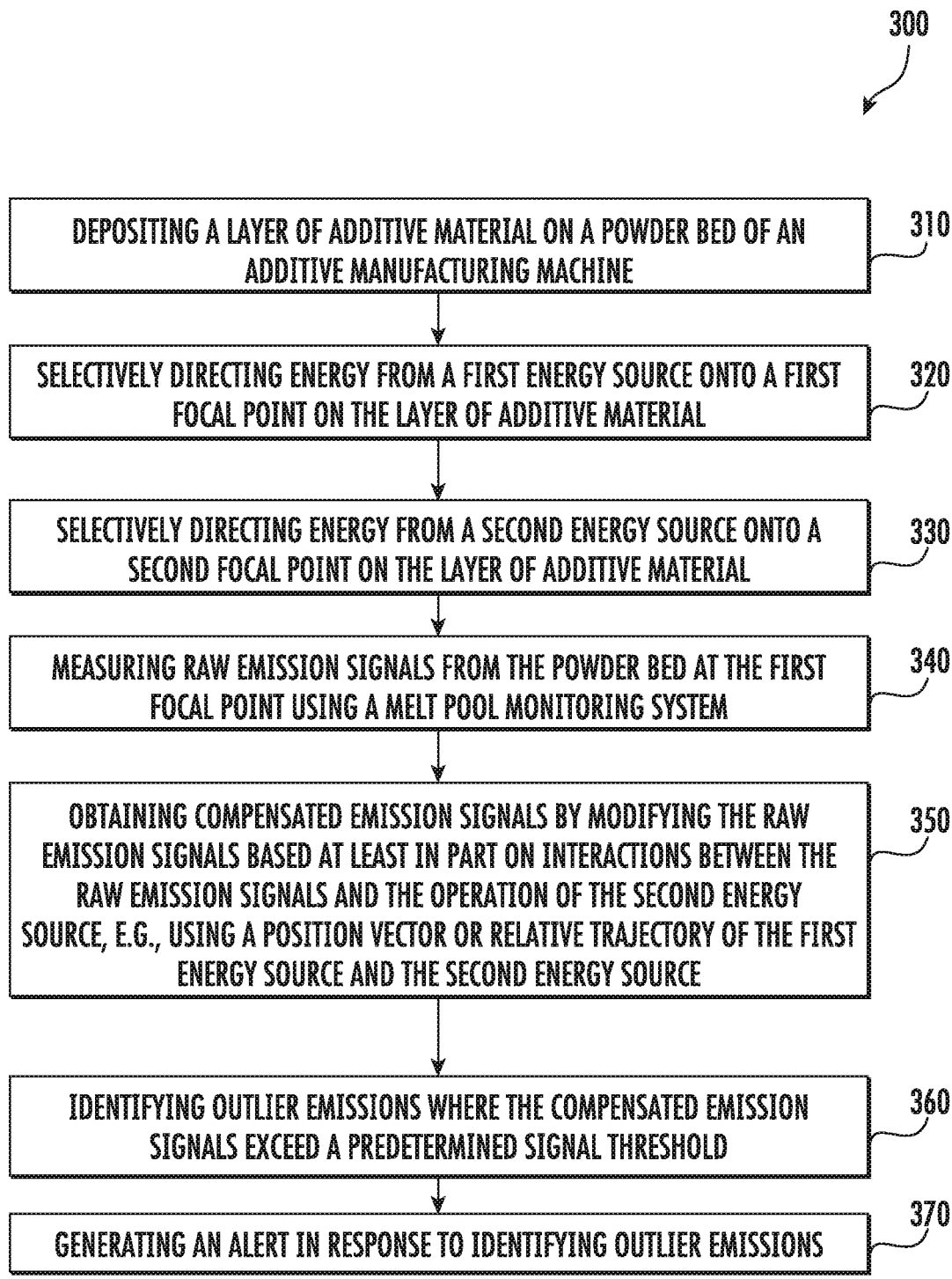
FIG. 4 is a method of monitoring a powder-bed additive manufacturing using a plurality of energy sources in accordance with one embodiment of the present disclosure.

Referring now to FIG. 4, method 300 includes, at step 310, depositing a layer of additive material on a powder bed of an additive manufacturing machine. For example, continuing the example from above, AM system 100 may use powder supply 112, recoater mechanism 114, and other subsystems to deposit build layer 172 over build platform 118. Steps 320 and 330 generally include using multiple energy sources to selectively fuse the layer of additive material. Specifically, step 320 includes selectively directing energy from a first energy source onto a first focal point on the layer of additive material (e.g., to generate first melt pool 252). In addition, step 330 includes selectively directing energy from a second energy source onto a second focal point on the layer of additive material (e.g., to generate second melt pool 262).

In this manner, steps 320 and 320 include selectively melting, sintering, or otherwise fusing additive powder 142 or other materials to form a portion of component 170. As explained above, this process of irradiating additive powder may emit electromagnetic emissions and other sintering/melting byproducts that may be used to monitor the additive manufacturing process. Notably, interactions between electromagnetic emissions and melt pool byproducts resulting from multiple melt pools 252, 262 may affect measurements obtained by melt pool monitoring system 200. Thus, steps 340 and 350 are generally directed to measuring multiple emissions in and around multiple melt pools and using that data compensate for such interactions in measured emission signals.

Specifically, step 340 includes measuring raw emission signals from the powder bed at the first focal point or first melt pool 252 using a melt pool monitoring system. Thus, step 340 includes measuring emission signals from the powder bed while irradiating the layer of powder. Notably, melt pool monitoring system 200 may also monitor energy or emissions from second energy source 260 or second melt pool 262. Thus, during the printing process, melt pool monitoring system 200 may generally obtain data indicative of melt pool emissions in any suitable format which may be further assessed or analyzed to monitor the print process and make determinations related to desirable process adjustments.

Step 350 includes obtaining compensated emission signals by modifying the raw emission signals based at least in part on interactions between the raw emission signals and the operation of the second energy source. In this regard, according to an exemplary embodiment, method 300 may include the steps of measuring secondary emission signals from the powder bed at the second focal point or second melt pool 262. In addition, obtaining the compensated emission signals may include modifying the raw emission signals (e.g. as determined at step 340) based at least in part on the secondary emission signals and position vector 280 and/or the relative trajectory of the energy sources, as described in more detail below.

For example, obtaining the compensated emission signals may include determining a position vector 280 between the first focal point (e.g., at first melt pool 252) and the second focal point (e.g., at second melt pool 262). For example, referring to FIG. 5, position vector 280 is illustrated as providing the spatial relationship between first melt pool 252 and second melt pool 262. Specifically, position vector 280 may represent a relative direction and distance between first melt pool 252 and second melt pool 262. Notably, this position vector 280 may be used in determining the likelihood that emissions or byproducts from one melt pool will affect another melt pool.

According to still other embodiments, obtaining the compensated emission signals may include determining a relative trajectory between first energy source 250 and second energy source 260. In this regard, as shown for example in FIG. 5, the relative trajectory may generally represent a difference between a first trajectory 282 of first energy source 250 and a second trajectory 284 of second energy source 260. For example, such trajectories may generally include an absolute position of a focal point for a melt pool, a commanded tool path of that focal point, and a projected velocity of that focal point along the commanded tool path. According to an exemplary embodiment, these trajectories may be calculated simply based on a prior timestamp and location of the focal point and a present timestamp and location of the focal point, which may be used to determine an approximate velocity and direction of the focal point in the future. According still other embodiments, the relative trajectory may be determined at least in part from a scan model (e.g., CAD model or derivative thereof) defining commanded tool paths (e.g., tool paths 256, 266).

According still other embodiments, obtaining compensated emission signals may include determining an emission correction factor that is used to modify the raw emission signals. For example, any suitable number of system parameters or operating conditions may be used to calculate the emission correction factor, which may operate as a gain to increase or reduce the raw emission signals.

The emission correction factor may depend on any suitable number of parameters, such as the relative position of energy sources (e.g. as determined by position vector 280), the relative trajectory of first energy source 250 and second energy source 260, and a flow vector 286 which represents a direction and magnitude of a flow of purge gas 270 over the powder bed. Notably, these and other system parameters may be used to predict how the electromagnetic emissions measured at first melt pool 252 may be affected by the operation of second energy source 260. Thus, the emission correction factor may generally be a probability that energy or byproducts emitted from second melt pool 262 are measured as light or byproducts emitted from first melt pool 252.

Although the examples above describe interactions between first energy source 250, second energy source 260, and/or their respective melt pools 252, 262, it should be appreciated that according to alternative embodiments, AM system 100 may include any other suitable number of energy sources, and methods described herein may be used to compensate for interactions between all of those energy sources to obtain more accurate melt pool monitoring. In this regard, the examples described herein are intended only to facilitate discussion or explanation of aspects of the present subject matter, but are not intended to limit the scope of the present invention.

For a normal process, random variation in the measured the electromagnetic emission signal is normal and expected. However, when the measured emissions exceed upper control limits or fall below lower control limits, these measured emissions may be considered out of the norm or "outlier emissions" which are generally undesirable. Thus, method 300 may further include, at step 360, identifying outlier emissions where the compensated emission signals exceed a predetermined signal threshold (or otherwise fall outside predetermined boundaries). For example, the predetermined signal threshold may be identified as the upper and lower control limits, which may generally be approximately three standard deviations for a normal distribution. Alternatively, the predetermined signal threshold may be any other suitable limit determined in any other suitable manner.

According to exemplary embodiments, the process of obtaining compensated emission signals may include creating a model of the melt pool response as a function of several variables, which may include, for example, laser power or drive signal, X and Y positional location on the build plate, laser scan velocity, laser scan direction, on-axis optical signal from melt pool and/or plasma (PD or pyrometer), melt pool size, off-axis optical signal from melt pool and/or plasma, incidence of angle of laser relative to build surface, incidence of angle of laser relative to part being built, gas flow velocity, and/or conductive properties of part being built below given layer/location. The model prediction can then be compared to the measured signal and the predetermined signal threshold applies to the difference between these two values. According to exemplary embodiments, important terms in the model for predicting the melt pool signal include the relative positions and trajectories of the multiple melt pools.

Method 300 further includes, at step 370, generating an alert in response to identifying the outlier emissions. Thus, when outlier emissions are identified in step 360, controller 220 may be configured for generating an alert, making a process change, or performing some other control action when the outlier emission is identified or exceeds some threshold. For example, the alert may be an audio or visual indication provided to an operator of the additive manufacturing machine. For example, the alert or indication may be displayed on a monitor for review of an operator (e.g., as a time-based plot, control chart, 3D indication or representation of compensated emission signal, etc.). Alternatively, the alert may be an email, text message, or other electronic message.

Alternatively, the alert may instead be an electronic signal to the machine controls that would stop or adjust a build parameter of the print process. In this regard, controller 220 may be programmed to automatically make the process adjustments to the additive manufacturing machine when an outlier emission is identified or exceeds a specific threshold. For example, controller 220 may be configured for adjusting an incidence angle of the energy source 120, the intensity of energy beam 122, the scan rate, the tool path, or any other process adjustment which will affect the printing of a cross-sectional layer or component 170 itself.

FIG. 4 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using AM system 100 and melt pool monitoring system 200 as an example, it should be appreciated that these methods may be applied to monitoring the operation of any suitable additive manufacturing machine.

Further aspects of the invention are provided by the subject matter of the following clauses:

1. A method of monitoring a powder-bed additive manufacturing process utilizing a plurality of energy sources, the method comprising: depositing a layer of additive material on a powder bed of an additive manufacturing machine; selectively directing energy from a first energy source onto a first focal point on the layer of additive material; simultaneously selectively directing energy from a second energy source onto a second focal point on the layer of additive material; measuring raw emission signals from the powder bed at the first focal point using a melt pool monitoring system; modifying the raw emission signals based at least in part on interactions between the raw emission signals and the operation of the second energy source to obtain a compensated emission signal; identifying outlier emissions from the compensated emission signal where the compensated emission signal exceeds a predetermined signal threshold; and generating an alert in response to identifying outlier emissions.

2. The method of any preceding clause, wherein modifying the raw emission signals to obtain the compensated emission signal comprises: determining a position vector between the first focal point and the second focal point, the position vector representing a relative direction and distance between the first focal point and the second focal point; measuring secondary emission signals from the powder bed at the second focal point; and modifying the raw emission signals based at least in part on the secondary emission signals and the position vector.

3. The method of any preceding clause, wherein modifying the raw emission signals to obtain the compensated emission signal comprises: determining a relative trajectory between the first energy source and the second energy source; measuring secondary emission signals from the powder bed at the second focal point; and modifying the raw emission signals based at least in part on the secondary emission signals and the relative trajectory of the first energy source and the second energy source.

4. The method of any preceding clause, wherein the relative trajectory is a difference between a first trajectory of the first energy source and a second trajectory of the second energy source, wherein each of the first trajectory and the second trajectory comprise: an absolute position of a focal point; a commanded tool path of the focal point; and a projected velocity of the focal point along the commanded tool path.

5. The method of any preceding clause, wherein the first trajectory is calculated based at least in part on a prior timestamp, a prior location of the first focal point, a present timestamp, and a present location of the first focal point.

6. The method of any preceding clause, wherein the relative trajectory is determined based at least in part from a scan model defining commanded tool paths used to facilitate the additive manufacturing process.

7. The method of any preceding clause, wherein modifying the raw emission signals to obtain the compensated emission signal comprises: determining an emission correction factor that is used to modify the raw emission signals.

8. The method of any preceding clause, wherein the emission correction factor is a function of at least one of a relative position between the first focal point and the second focal point, a relative trajectory of the first energy source and the second energy source, and a flow vector of a purge gas passing over the powder bed.

9. The method of any preceding clause, wherein the emission correction factor is a probability that energy or byproducts emitted from a second melt pool generated by the second energy source are measured as light or byproducts emitted from a first melt pool generated by the first energy source.

10. The method of any preceding clause, further comprising: selectively directing energy from a third energy source onto a third focal point on the layer of additive material, wherein obtaining compensated emission signals comprises modifying the raw emission signals based at least in part on interactions between the raw emission signals and the operation of the third energy source.

11. The method of any preceding clause, wherein the raw emission signals are obtained by at least one on-axis melt pool sensor.

12. The method of any preceding clause, wherein modifying the raw emission signals to obtain the compensated emission signal further comprises: measuring powder bed emission signals using an off-axis melt pool sensor; and modifying the raw emission signals based at least in part on the powder bed emission signals.

13. An additive manufacturing machine comprising: a powder depositing system for depositing a layer of additive material onto a powder bed of the additive manufacturing machine; a first energy source for selectively directing a first energy beam onto a first focal point on the layer of additive material; a second energy source for simultaneously selectively directing a second energy beam onto a second focal point on the layer of additive material; a melt pool monitoring system for measuring electromagnetic energy emitted from the powder bed; and a controller operably coupled to the melt pool monitoring system, the controller being configured for: measuring first emission signals emitted from a first melt pool formed at the first focal point by the first energy beam; measuring second emission signals emitted from a second melt pool formed at the second focal point by the second energy beam; modifying the first emission signals based at least in part on the second emission signals to obtain a compensated emission signal; identifying outlier emissions where the compensated emission signal exceeds a predetermined signal threshold; and generating an alert in response to identifying outlier emissions.

14. The additive manufacturing machine of any preceding clause, wherein modifying the first emission signals comprises: determining a position vector between the first focal point and the second focal point, the position vector representing a relative direction and distance between the first focal point and the second focal point; and modifying the first emission signals based at least in part on the second emission signals and the position vector.

15. The additive manufacturing machine of any preceding clause, wherein modifying the first emission signals comprises: determining a relative trajectory between the first energy source and the second energy source; and modifying the first emission signals based at least in part on the second emission signals and the relative trajectory of the first energy source and the second energy source.

16. The additive manufacturing machine of any preceding clause, wherein the relative trajectory is determined based at least in part from a scan model defining commanded tool paths used to facilitate the additive manufacturing process.

17. The additive manufacturing machine of any preceding clause, wherein modifying the first emission signals comprises: modifying the first emission signals based at least in part on a flow vector of a purge gas passing over the powder bed.

18. The additive manufacturing machine of any preceding clause, further comprising: a third energy source for selectively directing a third energy beam onto a third focal point on the layer of additive material, wherein obtaining compensated emission signals comprises modifying the first emission signals based at least in part on interactions between the first emission signals and the operation of the third energy source.

19. The additive manufacturing machine of any preceding clause, wherein the first emission signals and the second emission signals are obtained by at least one on-axis melt pool sensor.

20. The additive manufacturing machine of any preceding clause, wherein modifying the first emission signals further comprises: measuring powder bed emission signals using an off-axis melt pool sensor; and modifying the first emission signals based at least in part on the powder bed emission signals.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of monitoring a powder-bed additive manufacturing process utilizing a plurality of energy sources, the method comprising:
    depositing a layer of additive material on a powder bed of an additive manufacturing machine;
    selectively directing energy from a first energy source onto a first focal point on the layer of additive material;
    simultaneously selectively directing energy from a second energy source onto a second focal point on the layer of additive material;
    measuring raw emission signals from the powder bed at the first focal point using a melt pool monitoring system;
    modifying the raw emission signals based at least in part on interactions between the raw emission signals and the operation of the second energy source to obtain a compensated emission signal;
    identifying outlier emissions from the compensated emission signal where the compensated emission signal exceeds a predetermined signal threshold; and
    generating an alert in response to identifying outlier emissions;
    wherein modifying the raw emission signals comprises modifying the raw emission signals based at least in part on interactions between the raw emission signals and secondary emission signals, wherein the secondary emission signals are emitted from the powder bed at the second focal point.

2. The method of claim 1, wherein modifying the raw emission signals to obtain the compensated emission signal comprises:
    determining a position vector between the first focal point and the second focal point, the position vector representing a relative direction and distance between the first focal point and the second focal point;
    measuring the secondary emission signals from the powder bed at the second focal point; and
    modifying the raw emission signals based at least in part on the secondary emission signals and the position vector.

3. The method of claim 1, wherein modifying the raw emission signals to obtain the compensated emission signal comprises:
    determining a relative trajectory between the first energy source and the second energy source;
    measuring the secondary emission signals from the powder bed at the second focal point; and
    modifying the raw emission signals based at least in part on the secondary emission signals and the relative trajectory of the first energy source and the second energy source.

4. The method of claim 3, wherein the relative trajectory is a difference between a first trajectory of the first energy source and a second trajectory of the second energy source, wherein each of the first trajectory and the second trajectory comprise:
    an absolute position of a focal point;
    a commanded tool path of the focal point; and
    a projected velocity of the focal point along the commanded tool path.

5. The method of claim 4, wherein the first trajectory is calculated based at least in part on a prior timestamp, a prior location of the first focal point, a present timestamp, and a present location of the first focal point.

6. The method of claim 3, wherein the relative trajectory is determined based at least in part from a scan model defining commanded tool paths used to facilitate the additive manufacturing process.

7. The method of claim 1, wherein modifying the raw emission signals to obtain the compensated emission signal comprises:
    determining an emission correction factor that is used to modify the raw emission signals.

8. The method of claim 7, wherein the emission correction factor is a function of at least one of a relative position between the first focal point and the second focal point, a relative trajectory of the first energy source and the second energy source, and a flow vector of a purge gas passing over the powder bed.

9. The method of claim 7, wherein the emission correction factor is a probability that energy or byproducts emitted from a second melt pool generated by the second energy source are measured as light or byproducts emitted from a first melt pool generated by the first energy source.

10. The method of claim 1, further comprising:
    selectively directing energy from a third energy source onto a third focal point on the layer of additive material, wherein obtaining compensated emission signals comprises modifying the raw emission signals based at least in part on interactions between the raw emission signals and the operation of the third energy source.

11. The method of claim 1, wherein the raw emission signals are obtained by at least one on-axis melt pool sensor.

12. The method of claim 1, wherein modifying the raw emission signals to obtain the compensated emission signal further comprises:
measuring powder bed emission signals using an off-axis melt pool sensor; and
modifying the raw emission signals based at least in part on the powder bed emission signals.

13. An additive manufacturing machine comprising:
a powder depositing system for depositing a layer of additive material onto a powder bed of the additive manufacturing machine;
a first energy source for selectively directing a first energy beam onto a first focal point on the layer of additive material;
a second energy source for simultaneously selectively directing a second energy beam onto a second focal point on the layer of additive material;
a melt pool monitoring system for measuring electromagnetic energy emitted from the powder bed; and
a controller operably coupled to the melt pool monitoring system, the controller being configured for:
measuring first emission signals emitted from a first melt pool formed at the first focal point by the first energy beam;
measuring second emission signals emitted from a second melt pool formed at the second focal point by the second energy beam;
modifying the first emission signals based at least in part on the second emission signals to obtain a compensated emission signal;
identifying outlier emissions where the compensated emission signal exceeds a predetermined signal threshold; and
generating an alert in response to identifying outlier emissions;
wherein modifying the first emission signals comprises modifying the first emission signals based at least in part on interactions between the first emission signals and the second emission signals, wherein the second emission signals are emitted from the powder bed at the second focal point.

14. The additive manufacturing machine of claim 13, wherein modifying the first emission signals comprises:
determining a position vector between the first focal point and the second focal point, the position vector representing a relative direction and distance between the first focal point and the second focal point; and
modifying the first emission signals based at least in part on the second emission signals and the position vector.

15. The additive manufacturing machine of claim 13, wherein modifying the first emission signals comprises:
determining a relative trajectory between the first energy source and the second energy source; and
modifying the first emission signals based at least in part on the second emission signals and the relative trajectory of the first energy source and the second energy source.

16. The additive manufacturing machine of claim 15, wherein the relative trajectory is determined based at least in part from a scan model defining commanded tool paths used to facilitate the additive manufacturing process.

17. The additive manufacturing machine of claim 13, wherein modifying the first emission signals comprises:
modifying the first emission signals based at least in part on a flow vector of a purge gas passing over the powder bed.

18. The additive manufacturing machine of claim 13, further comprising:
a third energy source for selectively directing a third energy beam onto a third focal point on the layer of additive material, wherein obtaining compensated emission signals comprises modifying the first emission signals based at least in part on interactions between the first emission signals and the operation of the third energy source.

19. The additive manufacturing machine of claim 13, wherein the first emission signals and the second emission signals are obtained by at least one on-axis melt pool sensor.

20. The additive manufacturing machine of claim 13, wherein modifying the first emission signals further comprises:
measuring powder bed emission signals using an off-axis melt pool sensor; and
modifying the first emission signals based at least in part on the powder bed emission signals.

* * * * *